US012688052B2

(12) United States Patent
Lackritz et al.

(10) Patent No.: US 12,688,052 B2
(45) Date of Patent: Jul. 21, 2026

(54) GRAPH CENTRALITY-BASED CONVERSION PATH OPTIMIZATION FOR COMPUTING APPLICATIONS

(71) Applicant: INTUIT INC., Mountain View, CA (US)

(72) Inventors: Hadar Lackritz, Tel-Aviv (IL); Ido Joseph Farhi, Azor (IL); Natalie Bar Eliyahu, Azor (IL); Yair Horesh, Kfar-Saba (IL)

(73) Assignee: INTUIT INC., Mountain View, CA (US)

( * ) Notice: Subject to any disclaimer, the term of this patent is extended or adjusted under 35 U.S.C. 154(b) by 450 days.

(21) Appl. No.: 18/522,565

(22) Filed: Nov. 29, 2023

(65) Prior Publication Data

US 2025/0173165 A1    May 29, 2025

(51) Int. Cl.
*G06F 9/45* (2006.01)
*G06F 9/451* (2018.01)

(52) U.S. Cl.
CPC ................................... *G06F 9/451* (2018.02)

(58) Field of Classification Search
CPC ....................................................... G06F 9/451
USPC ....................................................... 719/320
See application file for complete search history.

(56) References Cited

PUBLICATIONS

Ahmad, Walid, Mason A. Porter, and Mariano Beguerisse-Diaz. "Tie-decay networks in continuous time and eigenvector-based centralities." IEEE Transactions on Network Science and Engineering 8.2 (2021): 1759-1771. (Year: 2021).*
Madduri, Kamesh, et al. "A faster parallel algorithm and efficient multithreaded implementations for evaluating betweenness centrality on massive datasets." 2009 IEEE international symposium on parallel & distributed processing. IEEE, 2009. (Year: 2009).*

* cited by examiner

*Primary Examiner* — Charlie Sun
(74) *Attorney, Agent, or Firm* — Patterson + Sheridan, LLP

(57) ABSTRACT

Methods of graph centrality-based conversion path optimization disclosed herein include determining central nodes of graph representations. Central nodes are determined separately for graph representations including a conversion node and separately for graph representations not including a conversion node. The nodes that are determined to be key nodes based on being central nodes for the graph representations including the conversion nodes but not for graph representations not including the conversion node may be used as candidate nodes. A candidate is selected from the candidate nodes, and an action associated with the candidate is presented to the user. An updated graph representation may be generated using data collected while the candidate is presented as a basis to determine updated key node candidates in a feedback loop.

17 Claims, 5 Drawing Sheets

GRAPH CENTRALITY-BASED CONVERSION PATH OPTIMIZATION FOR COMPUTING APPLICATIONS

INTRODUCTION

Aspects of the present disclosure relate to graph centrality-based conversion path optimization for computing applications, including determining one or more nodes for a lowest cost or shortest conversion path in order to provide improved functionality and performance.

BACKGROUND

Computing applications often utilize data stored in graph form in order to make automated determinations based on relationships represented in such graphs and/or to otherwise assist in various types of application functionality. In graph theory, centrality may refer to various indicators of different centrality types for a graph corresponding to relative position in the graph. Different concepts of centrality have been applied to social media influencers, super-spreaders of disease, and other situations where different types of key infrastructure nodes are theorized to exist.

In general, applying graph theory in computing applications can involve using paths of graphs consisting of nodes connected by edges for various computational tasks. In various contexts, it could be beneficial to determine optimal paths between nodes. However, as the number of nodes increases for a graph representation, determining and optimizing paths can become computationally untenable using traditional methods, such as resulting in high amounts of computing resource utilization. Further, it may be impossible for a computing application to predict what result may occur based on a particular change to node or edge of a graph representation using existing techniques. Thus, traditional methods cannot make inferences describing how to change a system to maximize the chance for a desired result based paths of a graph representation.

Thus, there exists a need in computing applications for improved techniques of path optimization, such as for determining optimal paths leading to one or more conversion nodes, and/or for improving or shortening a path leading a conversion node. There further exists a need for allowing a computing application to identify a node that is key node or central node for conversion paths to a selected conversion node. There is further a need for enabling a computing application to predict how a change to a graph representation will effect conversion paths.

BRIEF SUMMARY

Certain embodiments provide a computer-implemented method for graph centrality-based conversion path optimization. In various embodiments, methods disclosed herein comprise: collecting data related to a plurality of actions taken by a plurality of users in a computing environment, each user of the plurality of users either assigned a property or not assigned the property; generating a first graph representation for first users of the plurality of users that are assigned the property and a second graph representation for second users of the plurality of users that are not assigned the property; executing a centrality algorithm on the first graph representation and executing the centrality algorithm on the second graph representation to determine central nodes for the first graph representation and central nodes for the second graph representation; comparing the central nodes for the first graph representation and the central nodes for the second graph representation to identify a set of nodes unique to the first graph representation; selecting a particular action represented by a node of the set of nodes unique to the first graph representation; and providing output via a user interface based on the selecting of the particular action.

Other embodiments provide processing systems configured to perform the aforementioned methods as well as those described herein; a non-transitory computer-readable medium or media comprising executable instructions that, when executed by one or more processors of a processing system, causes the processing system to perform the aforementioned methods or to cause the aforementioned methods to be performed, as well as those described herein; a computer program product embodied on a computer readable storage medium comprising code for performing the aforementioned methods as well as those further described herein; and a processing system comprising means for performing the aforementioned methods or causing the aforementioned methods to be performed, as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
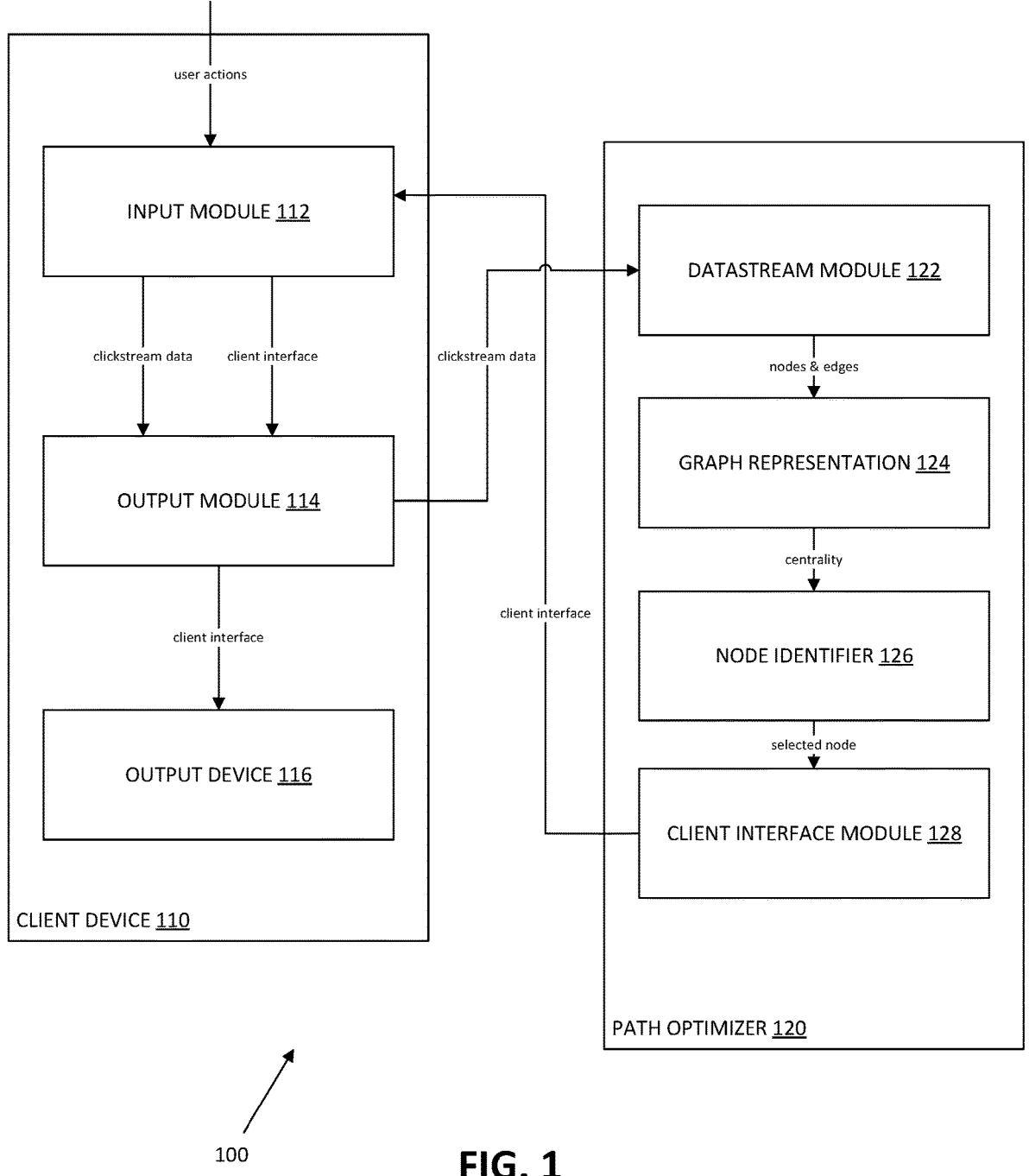
FIG. 1 illustrates an example computing environment for graph centrality-based conversion path optimization, according to various embodiments of the present disclosure.

Computing applications often make use of data stored in graph form for providing various types of functionality. For example, graph data representing past actions performed in a software application may be used to predict actions and/or automatically guide or prompt users of the software application to perform actions. A graph representation of a sequence of actions can be defined by including an edge from a particular node to a next node if an action represented by the next node followed an action from the particular node. A goal or target node may be selected as a conversion node, such that a path is considered converted if it reaches the conversion node. A graph representation of actions can be generated for actions taken by a user of a system. By presenting actions to a user that are determined using graph centrality-based optimization, paths can be improved in a number of ways. For example, a higher total path conversion rate, a shorter average conversion path, better identification of key actions leading to conversion, identification of key actions leading to conversion for different user types, identification of key nodes leading to to different conversion nodes, and/or other like benefits may be achieved. Thus, for example, techniques described herein may enable a software application to automatically identify an incremental action to recommend to a user in order to increase a likelihood of the user performing a target action, rather than directly recommending the target action, which may have a lower chance of success.

In various contexts, key actions are identified as candidates, a selection of which is presented to a user of a system. User action data is monitored with the selected action presented. Thus, a user interface can be changed dynamically based on actions performed by the user while an action is presented.

Key nodes may be identified by being central nodes for a graph representation of conversion paths but not central nodes for a graph representation of non-conversion paths. Key actions are then identified based on being represented by the key nodes and used as candidate actions for a selection process. A selection process may be performed on the candidate actions using various selection processes or algorithms For example, explore-exploit algorithms may be suitable for network structures related to centrality of graph representations and may be used to select presented actions from the candidate actions.

Embodiments of the present disclosure provide multiple technical improvements with respect to conventional computing applications. For example, by leveraging path optimizations described herein for graph representations of activity data, embodiments of the present disclosure allow a software application to more efficiently and accurately identify actions that are likely to lead a user to a specific target action, and to automatically lead the user to such actions via a user interface (e.g., through recommendations and/or other prompts). Furthermore, by automatically leading a user by a most efficient path that is most likely to result in a target action, techniques described herein avoid the computing resource utilization that would otherwise occur in connection with the user performing a larger number of actions on a less-efficient path to the target action in the computing application, and/or the computing resource utilization that would otherwise occur in connection with providing the user with prompts that are unlikely to result in the user performing an intended action. Thus, techniques described herein improve the functioning of computing applications by enabling automated user guidance that results in efficient performance of intended functionality, as well as the computing devices on which such applications run by a reduction in computing resource utilization.

Example Computing Environment for Graph Centrality-Based Conversion Path Optimization FIG. 1 illustrates an example computing environment 100 for graph centrality-based conversion path optimization. As illustrated, computing environment 100 includes a client device 110 in communication with a path optimizer 120.

As shown, the client device 110 includes an input module 102 and an output module 104. In the example shown, the input module 102 accepts input, such as various keyboard input or clickstream data from a user of the client device 110. The input is provided to the output module 104, and the input is then passed to the datastream module 122 by the output module 104. In various embodiments, a user may access an application or trial for an application hosted on the client device 110. Various data and metadata associated with the application may be included in the input provided to the path optimizer 120.

In FIG. 1, the path optimizer 120 includes a datastream module 122, a graph representation 124, a node identifier 126, and a client interface module 128. The datastream module 122 receives the input from the output module 104 of the client device 110. The datastream module 122 processes data received from the client device. For example, clickstream data may be transferred as a datastream to the datastream module 122 from the client device 110. The datastream module 122 can identify one or more sequences of user actions from the clickstream or other datastream data.

The one or more sequences of actions may be used to generate a graph representation 124 of the datastream representing the sequences of actions corresponding to respective nodes. The node identifier 126 may use various centrality algorithms and/or measures to measure, determine, identify, score, and/or rank centrality of one or more nodes of the graph representation 124. In some cases, a conversion node can be defined. Graph representations can be generated separately for paths including the conversion node and separately for paths not including the conversion node. In such contexts, nodes of a path may represent a chain of actions taken by a user from one or more previous actions to one or more subsequent actions.

In various embodiments, the client interface module 128 generates a client interface presenting an action associated with an identified, scored, or ranked node of the graph representation that is scored or ranked based on a centrality score or centrality rank. In some cases, an action associated with a highest ranked node may be presented to a user on the output device 106 of the client device 110. However, in some embodiments, an explore-exploit multi-armed-bandit process is used to select an action to present on the output device 116. The explore-exploit multi-armed-bandit process may be based in part on a defined or chosen centrality measure or combination of measures.

The action which corresponds to the selected node may be presented in the form of a banner, popup, hyperlink, button, or other user interface element, such as by being displayed on a screen or monitor. Alternatively, the action may be presented by automatically navigating to a page or displaying content associated with the action. Clickstream data can be recorded after the action is presented to determine if and/or when a presented user action is performed, such as when a presented user interface element is selected or otherwise interacted with. In example embodiments where clickstream data is collected or recorded for many users, each chain of actions of the users may be used to generate graph representations. This may include refreshing the graph representations after a period of time, such as an hour, a day, a week, or a longer or shorter period of time to include additional or newly input clickstream (or other user action) data.

After a threshold, such as a period of time a presented user action has not been performed, after a period of time has elapsed, a number of user actions being performed, a number of other user action beings performed, etc, a new selection of one or more actions to be presented can be determined using the explore-exploit multi-armed-bandit process (or other process). In this way, an algorithmic selection of various actions corresponding to different nodes can be performed based in part on the nodes' measures of centrality. Paths including those nodes can be efficiently explored by the multi-armed bandit selection processes. Presenting actions associated with nodes having a high rank or score for a measure of centrality results in an increased likelihood that a conversion node will be reached. Further this increased likelihood that the conversion node is reached may increase a centrality measure for the node, which may reinforce a determination of the node as a key node which significantly increases a likelihood of conversion.

In some embodiments, graph representations may represent previous user actions recorded in a corpus of user action data that is used to generate the graph representations. The graph representations of the corpus of user action data are used to determine candidate actions to be presented.

Clickstream data (or other user data) for one or more live users that are active users during a period when the candidate actions are presented can also be recorded and stored in a second corpus of data. Graph representations may be regenerated periodically to add representations of the second corpus of data, as well as any subsequent data. In various embodiments, the graph representation may be regenerated or updated every two to four days, or a greater or shorter period of time, using user action data collected while candidate actions are presented to users.

Retraining, such as by regenerating graph representations and identifying a new set of key nodes for subsequent data enables a feedback loop which optimizes the presented actions. Calculating centrality for each loop and making selections from among candidate nodes determined using the updated centrality measures for the regenerated graph representations of the respective loops enables a dynamic determination of centrality. Also, each iteration of the feedback loop provides a new set of conversion paths and/or non-conversion paths. In some cases, a presented user action is represented by a new node and/or edge of a new set of conversion and/or non-conversion paths. In this example, the path to conversion is shortened and/or optimized by presenting user action represented by the new node and/or edge being presented, such as by a new intermediary node to a conversion node being generated or an edge being added that shortens a conversion path, for example by shortening the minimum possible length of a conversion path.

Furthermore, such a shortening and/or optimization can occur for each loop. At each iteration of the feedback loop, conversion paths may be optimized. Centrality for the updated graph representations for each loop can be used to determine different subsequent candidate nodes representing selected actions to be presented to users during a subsequent loop.

In various embodiments, an explore-exploit multi-armed-bandit selection algorithm may be used to make a selection from among candidate nodes. Such algorithms may increase efficiency for exploring paths of a graph representation to more quickly identify paths reaching a target node, and such algorithms may be used to efficiently select a distribution of nodes to be selected by making a selection which prefers high-ranking nodes but which sometimes selects low-ranking nodes. Various explore-exploit algorithms or bandit algorithms using a centrality ranking or centrality score may be used for determining next actions to be presented to a user.

As noted, clickstream data (or other user action data) can be collected for live users to determine whether presented actions are performed, and/or to determine other user actions that are performed instead (e.g., if the presented actions are not performed). The recorded live user data may be used to for a next iteration of generating graph representations, determining candidate nodes based on centrality uniqueness (being central in a graph representation but not another graph representation), and selecting a candidate action by determining a node according to the explore-exploit multi-armed-bandit (or other) selection algorithm. Various algorithms may be used to determine a first selection based on centrality, and one or more different selections based on centrality. A selection with a highest centrality value may be used and/or a selection comprising a distribution of centrality values defined according to a selection algorithm.

Figure 2:
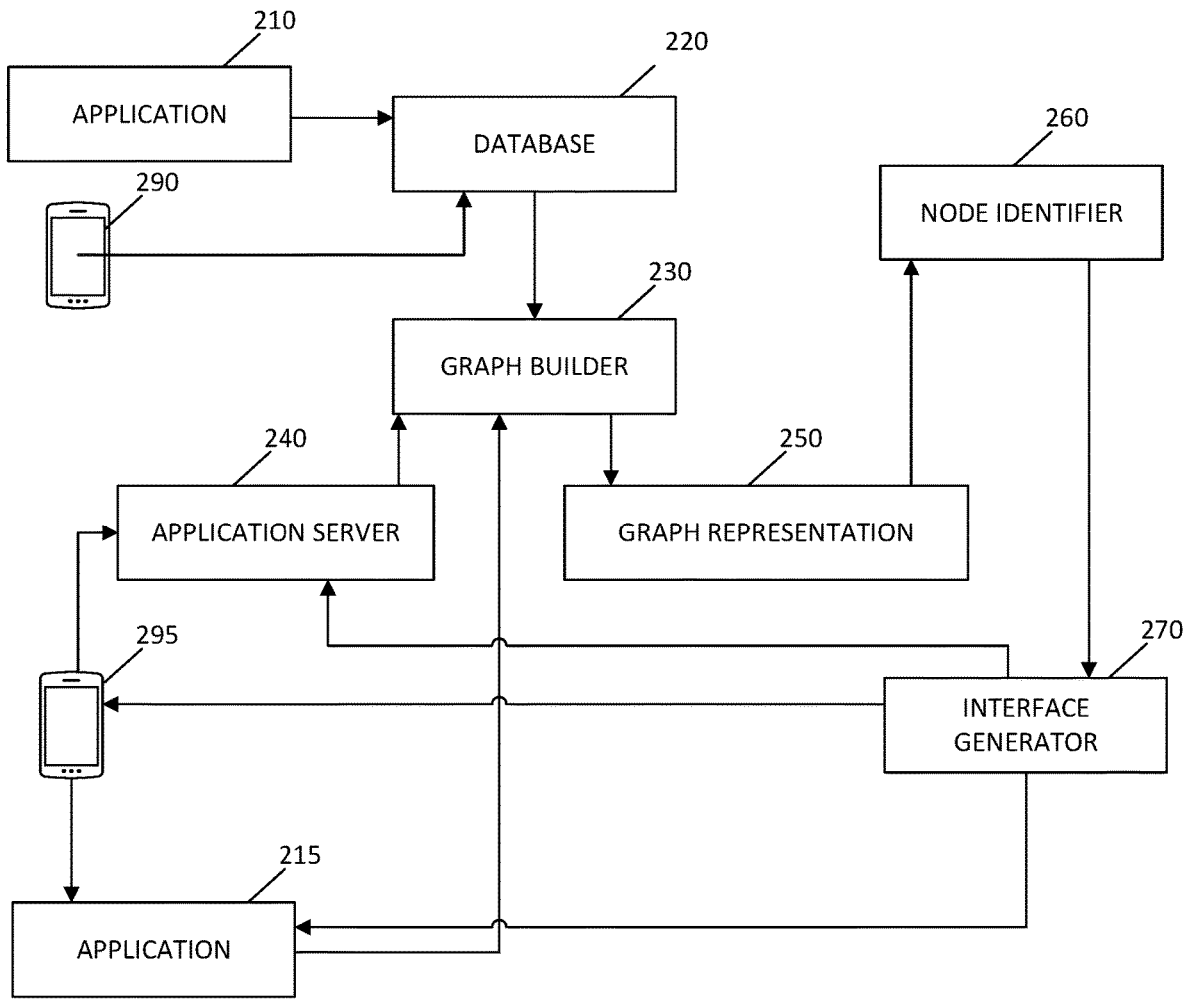
FIG. 2 illustrates an example system architecture using graph centrality-based conversion path optimization, according to various embodiments of the present disclosure.

Example System Architecture Using Graph Centrality-Based Conversion Path Optimization FIG. 2 illustrates an example system architecture 200 for centrality-based conversion path optimization, according to various embodiments of the present disclosure. As illustrated, the system architecture includes one or more applications 210, 215, a database 220, a graph builder 230, a graph representation 240, an application server 250, a node identifier 260, an interface generator 270, and one or more user devices 290, 295.

One or more user devices 290 may be connected to the system architecture or may interact with the system architecture by providing input, such as touch data, keystroke data, clickstream data, or the like. The data may be stored at the database 220, or may be provided directly to the graph builder 230. One or more applications 210 may also provide data to the database 220, or directly to the graph builder 230. In some embodiments, the graph builder 230 may make a selection of data from the database 220 for building a graph representation of the selected data.

In some embodiments, a user device 295 may be used to connect to an application server 240 which hosts one or more user applications, which may include trial versions or trials for the applications hosted at the application server. Keystroke and/or clickstream data received by the application is recorded and passed to the graph builder 230. In certain embodiments, an application 215 may be accessed by a user device and may provide data to the graph builder 230 without being accessed at an application server 240, such as application 215. Graph builder 230 may have internal memory or storage for storing the data, or may use external memory or storage to store data or process data for graph building.

In FIG. 2, the graph builder 230 builds the graph representation 250 by representing user actions described by the data the graph builder 230 receives as nodes and by adding a directed edge from a first node to a second node if an action associated with the second node followed an action associated with the first node. The graph representation 250 may be built from recorded or stored data from application 210, database 220, and/or user device 290. The node identifier 260 may identify candidate nodes using centrality. For example, various centrality algorithms may be used to generate centrality ranks or centrality scores for nodes of the graph representation 250. Centrality values may be determined for a graph representation generally, or may more particularly be generated for paths representing causal chains of actions. In embodiments disclosed herein, separate graph representations are generated separately for conversion paths leading to a particular conversion node, and separately for paths not leading to a particular conversion node. By selecting actions using an explore-exploit multi-armed-bandit process to determine which candidate action are presented to a user based in part on centrality of the nodes available the next hops or the next node, paths leading to a different conversion rate or a shorter conversion distance can be effectively explored and exploited.

Once node identifier 260 selects a node of the graph representation 250, an action associated with the node is determined and identified for the interface generator 270. The interface generator generates a user interface presenting the action. In various embodiments, the action may be presented in various ways, such as a combination of one or more of a button, pop-up, banner, hyperlink, image, text, etc., and/or by navigating to a page or otherwise displaying content. The user interface may be provided to the application server 240 accessed by the user device 295, to the application 215, or to the user device 295 directly using one or more interfaces.

Data may continue to be collected at one or more of the application 215, the application server 240, and/or the user device 295 with the generated user interface presented. In this way, clickstream or other data is collected that includes a user action performed during a period where a selected user action is presented. Detecting candidate actions corresponding to central nodes for presentation using centrality of the graph representation and presenting a selection of those actions optimizes possible paths to conversion by reducing the number of actions to conversion or increasing the likelihood of conversion.

Example of Centrality of a Graph Representation Node

Figure 3:
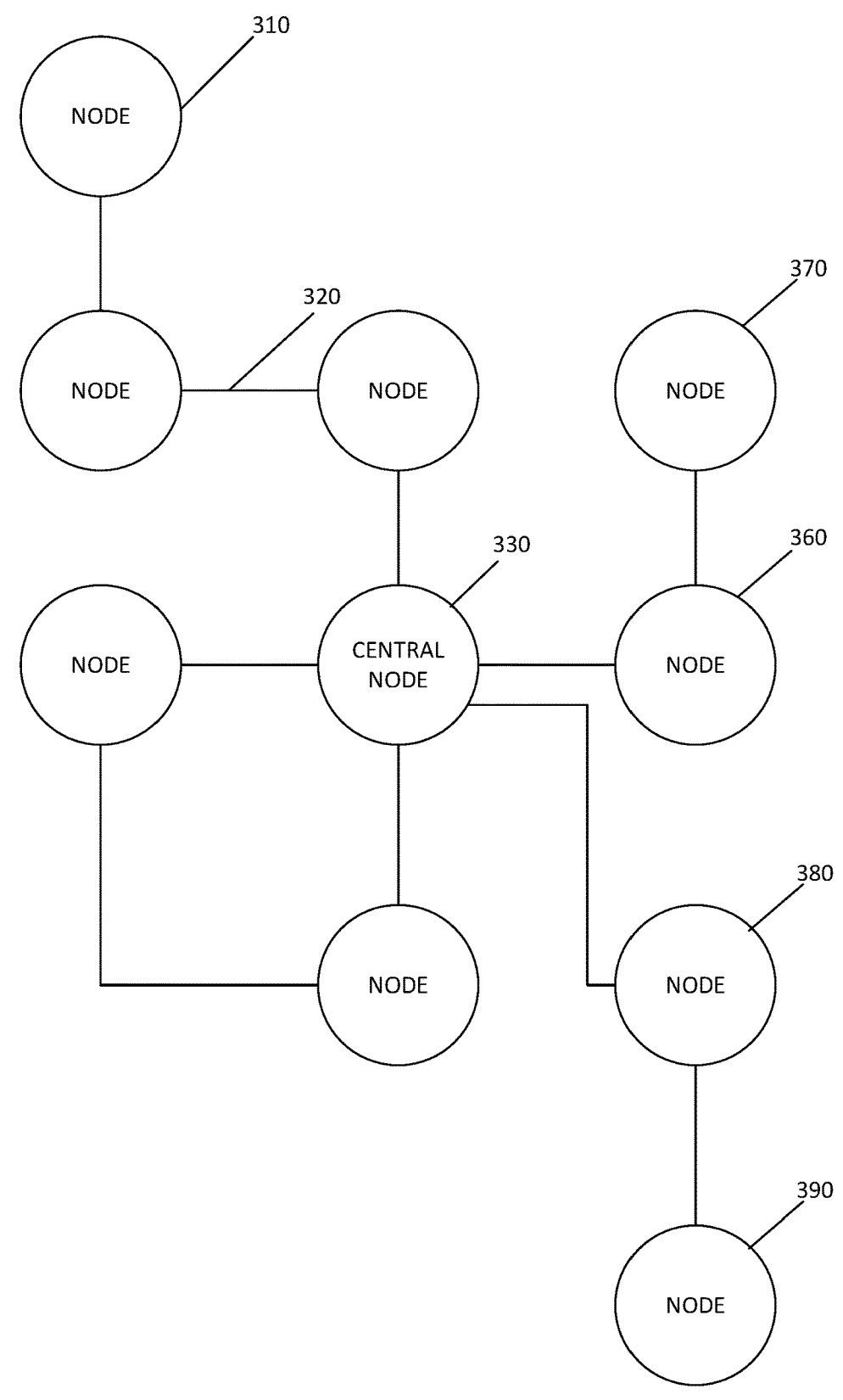
FIG. 3 illustrates an example workflow using graph centrality-based conversion path optimization, according to various embodiments of the present disclosure.

FIG. 3 illustrates an example graph representation 300 having a plurality of nodes 310, including nodes 330, 360, 370, 380, and 390. The graph representation also has a plurality of edges 320 between the nodes as shown. Various measures of centrality can be determined for each node 310 according different algorithms that generate values based on relative network position or other parameters of the nodes. For example, one centrality measure for a node 310 may be based on the number and distribution of directly connected and/or indirectly connected nodes and edges. Some measures of centrality of a particular node can be defined in terms of a target conversion node. For example, such measure may define centrality in terms of the proportion of paths to a conversion node that include a particular node, or in terms of a uniqueness of paths to a conversion node passing through the particular node. These are just example and other various definitions or algorithms can be used to define a centrality measure.

In the example of FIG. 3, the node 330 may be a considered a central node due to a high centrality rank or high centrality value for one of various centrality measures which may be applied to the graph representation 300. One centrality measure that can be used is the number of connected nodes, in which case central node 330 has the highest score for the centrality measure (five directly connected nodes), and the highest rank (first rank) for the centrality measure, due to having the most directly connected nodes.

As another example, node 360 may be considered to be more central than node 370 due to being more closely connected to central node 330. In yet another example, node 390 is a conversion node. In this example, node 360 may be considered a more central node than node 370 due to being closer to the conversion node 390. Also, node 380 and node 330 may be considered the most central nodes because the greatest number of conversion paths to conversion node 390 include these nodes and/or because these nodes are the most closely connected to the conversion node 390.

The graph representation 300 of FIG. 3 is but one example of a graph representation for which centrality measures may be used. Graph representations can be simpler, or significantly larger or more complex, and various different centrality measures may be applied to rank or score nodes according to centrality. Different centrality measures for graph representations may be determined by applying any one or more of a variety of centrality algorithms to the graph representation, including but not limited to: degree-based centrality algorithm, a closeness-based centrality algorithm, a betweenness-based centrality algorithm, an Eigenvector-based centrality algorithm, a Katz's centrality measure-based centrality algorithm, a PageRank-based centrality algorithm, a percolation-based centrality algorithm, a cross-clique centrality-based centrality algorithm, a Freemen centralization-based centrality algorithm, and/or a dissimilarity-based centrality algorithm, or the like. The various centrality measures disclosed herein are known to have different strengths and weaknesses when applied to different types of networks. Thus, various measures of centrality may be used in accordance with features discussed herein without departing from the scope of this disclosure.

Example Method of Graph Centrality-Based Conversion Path Optimization

Figure 4:
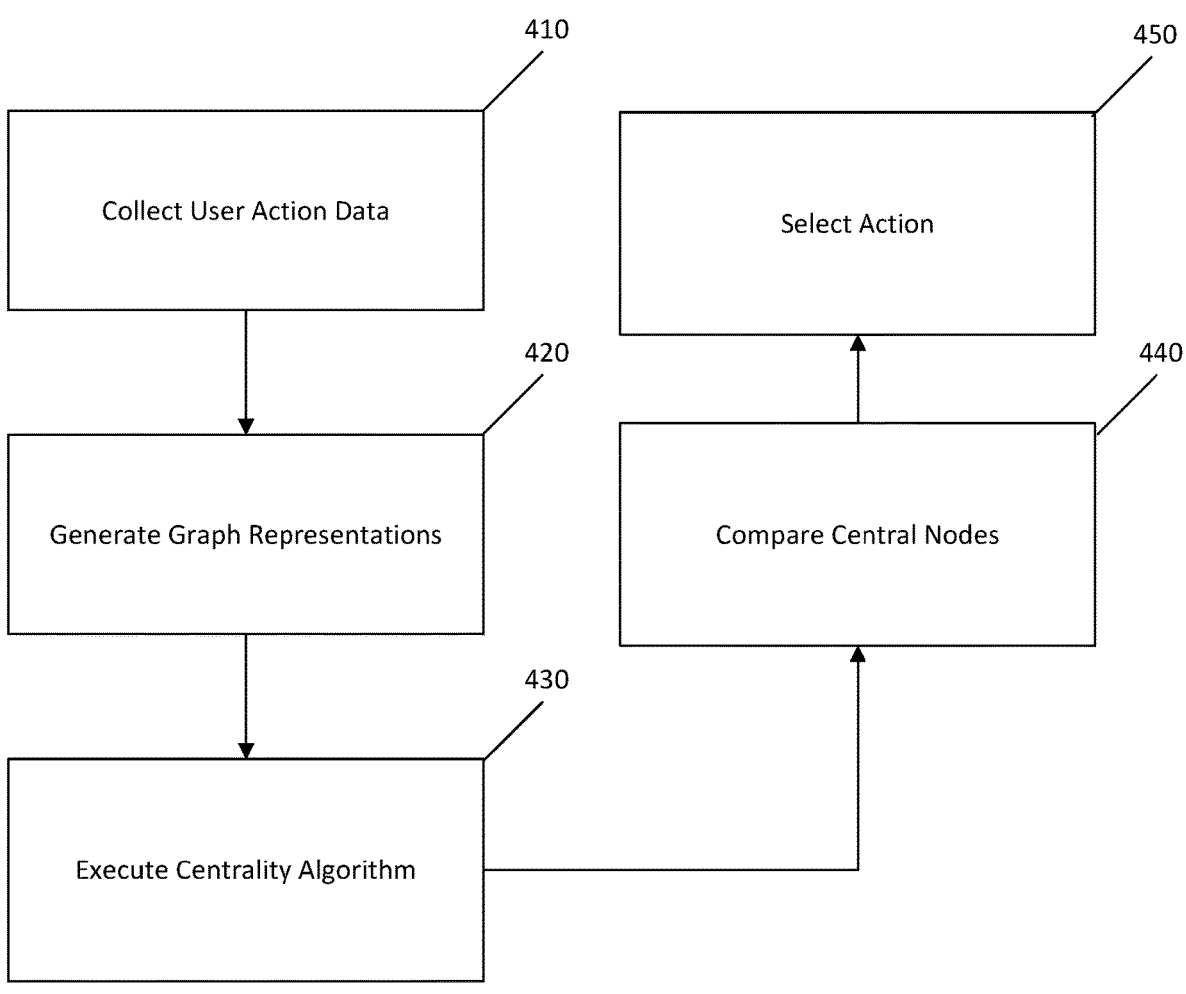
FIG. 4 illustrates an example method of graph centrality-based conversion path optimization, according to various embodiments of the present disclosure.

FIG. 4 illustrates an example method 400 of graph centrality-based conversion path optimization, according to various embodiments of the present disclosure. In FIG. 4, the method 400 begins at stage 410 where user action data is collected. For example, a corpus of data including a variety of user actions may be received by a server device. The corpus of data may include any number of users and actions. The actions may be ordered for a user, such that it is known for each action what action preceded and/or succeeded the action. User action data may be collected live, or from a database of previously collected data.

The user action data may also include, for each chain of user actions starting with an initial user action and ending in a final user action, an indication whether the chain of action included a particular action. The particular action being taken may represent a conversion for the action chain. Each chain of actions for a user can be tagged or labeled according to whether or not the chain of actions included a particular conversion action, for example by labeling a user or a chain of user actions with a "1" if the user is converted (i.e. a conversion action is taken), and labeling a user or a chain of user actions with a "0" if the user is not converted (i.e., if a conversion action is not taken). It is noted that a conversion action may refer to adoption or purchase of a product, feature, or service, or may otherwise refer to another type of action related to a computing application (e.g., that a provider of the application wants the user to perform).

From step 420 where the user action data is collected, the method 400 may proceed to stage 420 where graph representations are generated. A first graph representation may be generated for users or chains of user actions having a property, or being assigned a particular label. A second graph representation may be generated for users or chains of user actions not having the property or not assigned the particular label. The paths of the graph representations can represent chains of user actions including an indication of whether the user performed a target conversion action (i.e. whether a chain of actions includes the conversion action). Separate graph representations can be generated separately for chain of actions having different labels (i.e. "1" and "0"). In some cases, multiple conversion nodes may each have a different label.

In some cases, a first conversion action may be a user purchasing a base subscription, and a second conversion action may be a user purchasing a premium subscription, or a base subscription of a different type. For chains of actions in which no conversion node was reached, a label of "0" may be used. For chains of actions in which a first conversion node is reached, a label of "1" may be used. For chains of actions in which a second conversion node is reached, a label of "2" may be used, and so forth. For each particular type of label for the one or more conversion nodes, a graph representation may be generated.

The method 400 may then proceed to stage 430 where a centrality algorithm is executed. For example, a betweenness centrality or closeness centrality algorithm may be executed on each of the graph representations to determine nodes that have a high centrality rank or high centrality measure for the graph representations.

Next, the method 400 may proceed to stage 440 where central nodes are compared. In embodiments where a first graph representation is generated for chains of user actions reaching a conversion node and a second graph representation is generated for chains of user actions reaching a second conversion node (or no conversion node), the central nodes for each of the graph representations can be compared to determine unique central nodes that are central nodes for one graph representation but not another. In various embodiments, a rank threshold or score threshold for a centrality measure may be used to determine which nodes are central nodes for each graph representation. User actions corresponding to nodes which are unique to one or more of the graph representations are determined and used as candidates for actions to be presented to a user.

The method 400 may then proceed to stage 450 where an action is selected. In some embodiments, a set of candidate actions may be determined by identifying nodes which are determined to be central for the graph representation of a chain of user actions including a conversion node. In some cases, the identified node is not central for graph representations of chains of user actions not including the conversion node. A selection algorithm may be applied to the set of candidate actions to determine a selected candidate action.

One process by which an action may be selected is an explore-exploit multi-armed bandit process. This process may be applied to a webpage, website, or other user environment in which the actions available to a user of the website may make up the nodes of a graph representation. One example implementation of how an action may be selected for a website may be as follows: A random page i is picked and a random action j available on page i is picked. An initial sampling value T is set between 0 and 1. A random t between 0 and 1 is determined. If t<T then a random node is selected from candidate nodes. Otherwise, the node with the highest centrality is selected for being presented, where each node can be represented by (page i, action j). If an action corresponding to a navigation to another web page of the website is received, a new random t is determined and a next node to be presented is determined based on whether the new random t is greater than or equal to T. In this way, both the node with the highest centrality is presented, and all other candidate nodes may be presented.

In certain embodiments, the selected candidate action may be presented, such as by provided a user interface presenting the action to a user, user device, application, or other endpoint. In some cases, the action may be presented while subsequent, active user data collection is being performed on the user, user device, application, or other endpoint. After the expiration of a period of time, or after a number of actions has been taken without the presented action being taken, one or more other actions may be selected according to the selection algorithm. Once one or more actions have been selected and/or presented, and/or subsequent user data collected, the method 400 may conclude. In various embodiments, output may be provided by the server device via a user interface based on the selecting of the particular action.

Example System Using Graph Centrality-Based Conversion Path Optimization

Figure 5:
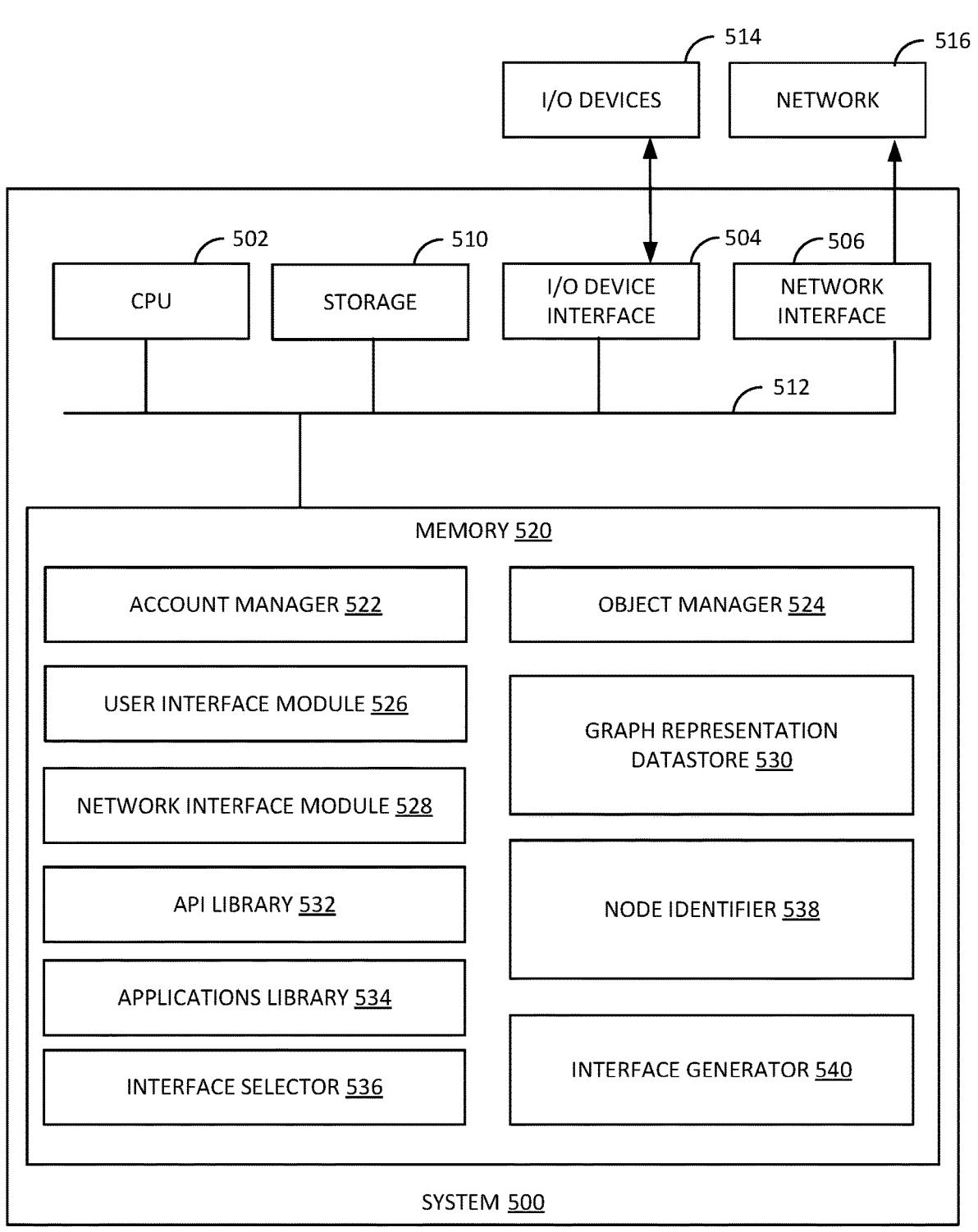
FIG. 5 illustrates an example system configured to generate results from a language model using graph centrality-based conversion path optimization, according to various embodiments of the present disclosure.

FIG. 5 illustrates an example system 500 configured to perform the methods described herein, including, for example, method 400 of FIG. 4. In some embodiments, system 500 may act as a conversion path optimizer, such as the path optimizer 120 of FIG. 1.

As shown, system 500 includes a central processing unit ("CPU") 502, one or more I/O device interfaces 504 that may allow for the connection of various input and/or output ("I/O") devices 514 (e.g., keyboards, displays, mouse devices, pen input, etc.) to the system 500, network interface 506 through which system 500 is connected to network 516 (which may be a local network, an intranet, the internet, or any other group of computing devices communicatively connected to each other), a memory 520, storage 510, and an interconnect 512. In embodiments, the I/O devices 514 and/or network interface 506 may be used to receive input and output a response generated based on optimizing a conversion path of a graph representation of the input.

CPU 502 may retrieve and execute programming instructions stored in the memory 520 and/or storage 510. Similarly, the CPU 502 may retrieve and store application data residing in the memory 520 and/or storage 510. The interconnect 512 transmits programming instructions and application data, among the CPU 502, I/O device interface 504, network interface 506, memory 520, and/or storage 510. CPU 502 is included to be representative of a single CPU, multiple CPUs, a single CPU having multiple processing cores, and the like.

Memory 520 is representative of a volatile memory, such as a random access memory, or a nonvolatile memory, such as nonvolatile random access memory, phase change random access memory, or the like. As shown, memory 520 includes an account manager 522, an object manager 524, a user interface module 526, a graph representation datastore 530, an application programming interface ("API") library 532, an applications library 534, an interface selector 536, node identifier 538, and an interface generator 540.

The account manager 522 may be used to manage information associated with particular users of the system 500. For example, the account manager may be used to authenticate a user or provide user profile information. The object manager 524 may be used to manage objects, such as generating or storing a user action log, accounts, graph representations, or other data objects associated with or used by the system 500. In various embodiments, a user interface module 526 is included to prepare data for output to one or more of the I/O devices 514 via the I/O interface 504. Network interface module 528 may similarly prepare data for output to one or more locations on the network 516 via the network interface 506.

In various embodiments, the API library 532 may include one or more application programming interfaces for facilitating interaction between external applications and/or internal applications, which may be stored or accessed via the applications library 534. In FIG. 5, the graph representation datastore includes one or more graph representations of user action data. In an embodiment, a first graph representation represents chains of user actions resulting in a user performing a conversion action, and a second graph representation represents chains of user actions not resulting in performing a conversion action. Generally, the node identifier 538 compares nodes associated with the graph representations of the graph representation datastore 530 to identify nodes of a particular graph representation that are uniquely central to that graph representation. Nodes may be identified by the node identifier 538 based on centrality measures. Nodes identified as central nodes for a graph representation that that are not present or not central nodes for another graph representation may also be identified by the node identifier 538. In this way, node identifier 538 can identify nodes that are associated with central for chains of user actions resulting in a conversion action that are not present or are not central for chains of user actions not resulting in the conversion action.

The interface generator 540 generates interfaces including presentations of actions represented by nodes identified as central for the graph representation including conversion paths to a conversion node but not identified (or identified as not central) for the graph representation representing non-conversion paths. Actions associated with the nodes determined to be central for one graph representation but not another may be presented as part of a user interface to a user, such as by transmitting a user interface for the action via the I/O device interface 504 or the network interface 506. In various embodiments clickstream data, or other user data, may include data collected from the user interface while the user interface for the action is presented to the user and may include whether the user has performed the presented action or any other actions presented by or along with the user interface.

Example Clauses

Aspect 1: A method, comprising: collecting data related to a plurality of actions taken by a plurality of users in a computing environment, each user of the plurality of users either assigned a property or not assigned the property; generating a first graph representation for first users of the plurality of users that are assigned the property and a second graph representation for second users of the plurality of users that are not assigned the property; executing a centrality algorithm on the first graph representation and executing the centrality algorithm on the second graph representation to determine central nodes for the first graph representation and central nodes for the second graph representation; comparing the central nodes for the first graph representation and the central nodes for the second graph representation to identify a set of nodes unique to the first graph representation; selecting a particular action represented by a node of the set of nodes unique to the first graph representation; and providing output via a user interface based on the selecting of the particular action.

Aspect 2: The method of Aspect 1, wherein generating the first graph representation for the first users of the plurality of users that are assigned the property and the second graph representation for the second users of the plurality of users that are not assigned the property comprises: for each respective first user having the property: representing one or more actions of the respective first user having the property as one or more nodes in the first graph representation; and for each respective node of the one or more nodes in in the first graph representation representing a next action from a previous action for the respective first user having the property, adding an edge between the respective node and a node representing the previous action in the first graph representation; and for each respective second user not having the property: representing one or more actions of the respective second user not having the property as one or more nodes in the second graph representation; and for each respective node of the one or more nodes in in the second graph representation representing a next action from a previous action for the respective second user not having the property, adding an edge between the respective node and a node representing the previous action in the second graph representation.

Aspect 3: The method of any of Aspects 1-2, further comprising defining a page and action having a centrality value, wherein selecting the particular action comprises making a selection between a random action associated with the set of nodes unique to the first graph representation and an action with a highest centrality value based on a sampling value; and presenting the particular action.

Aspect 4: The method of any of Aspects 1-3, further comprising, in response to detecting a navigation away from the particular action, presenting a second action comprising a different selection between a random action associated with the set of nodes unique to the first graph representation and an action with a highest centrality value based on the sampling value.

Aspect 5: The method of any of Aspects 1-4, wherein the particular action is selected using an explore-exploit multi-armed bandit process to select a node of the set of nodes unique to the first graph representation.

Aspect 6: The method of any of Aspects 1-5, wherein providing the output via the user interface based on the selecting of the particular action comprises displaying the particular action as at least one of a banner, a link, or a pop-up.

Aspect 7: The method of any of Aspects 1-6, comprising, after a period of time since the particular action is presented, collecting second data related to the particular action, generating a new first graph representation and a new second graph representation and presenting a second action as a second selection based on the new first graph representation and the new second graph representation.

Aspect 8: The method of any of Aspects 1-7, wherein the centrality algorithm comprises a selection from a degree-based centrality algorithm, a closeness-based centrality algorithm, a betweenness-based centrality algorithm, an Eigenvector-based centrality algorithm, a Katz's centrality measure-based centrality algorithm, a PageRank-based centrality algorithm, a percolation-based centrality algorithm, a cross-clique centrality-based centrality algorithm, a Freemen centralization-based centrality algorithm, or a dissimilarity-based centrality algorithm.

Aspect 9: A system comprising a computing device having a processor and a memory having executable instructions stored thereon, which, when executed, cause the processor to perform a method of: collecting data related to a plurality of actions taken by a plurality of users in a computing environment, each user of the plurality of users either assigned a property or not assigned the property; generating a first graph representation for first users of the plurality of users that are assigned the property and a second graph representation for second users of the plurality of users that are not assigned the property; executing a centrality algorithm on the first graph representation and executing the centrality algorithm on the second graph representation to determine central nodes for the first graph representation and central nodes for the second graph representation; comparing the central nodes for the first graph representation and the central nodes for the second graph representation to identify a set of nodes unique to the first graph representation; selecting a particular action represented by a node of the set of nodes unique to the first graph representation; and providing output via a user interface based on the selecting of the particular action.

Aspect 10: The system of Aspect 9, wherein generating the first graph representation for the first users of the plurality of users that are assigned the property and the second graph representation for the second users of the second plurality of users that are not assigned the property comprises: for each respective first user having the property: representing one or more actions of the respective first user having the property as one or more nodes in the first graph representation; and for each respective node of the one or more nodes in in the first graph representation representing a next action from a previous action for the respective first user having the property, adding an edge between the respective node and a node representing the previous action in the first graph representation; and for each respective second user not having the property: representing one or more actions of the respective second user not having the property as one or more nodes in the second graph representation; and for each respective node of the one or more nodes in in the second graph representation representing a next action from a previous action for the respective second user not having the property, adding an edge between the respective node and a node representing the previous action in the second graph representation.

Aspect 11: The system of any of Aspects 9-10, further comprising defining a page and action having a centrality value, wherein selecting the particular action comprises making a selection between a random action associated with the set of nodes unique to the first graph representation and an action with a highest centrality value based on a sampling value; and presenting the particular action.

Aspect 12: The system of any of Aspects 9-11, further comprising, in response to detecting a navigation away from the particular action, presenting a second action comprising a different selection between a random action associated with the set of nodes unique to the first graph representation and an action with a highest centrality value based on the sampling value.

Aspect 13: The system of any of Aspects 9-12, wherein the particular action is selected using an explore-exploit multi-armed bandit process to select a node of the set of nodes unique to the first graph representation.

Aspect 14: The system of any of Aspects 9-13, wherein providing the output via the user interface based on the selecting of the particular action comprises displaying the particular action as at least one of a banner, a link, or a pop-up.

Aspect 15: The system of any of Aspects 9-14, comprising, after a period of time since the particular action is presented, collecting second data related to the particular action, generating a new first graph representation and a new second graph representation and presenting a second action as a second selection based on the new first graph representation and the new second graph representation.

Aspect 16: The method of any of Aspects 9-15, wherein the centrality algorithm comprises a selection from a degree-based centrality algorithm, a closeness-based centrality algorithm, a betweenness-based centrality algorithm, an Eigenvector-based centrality algorithm, a Katz's centrality measure-based centrality algorithm, a PageRank-based centrality algorithm, a percolation-based centrality algorithm, a cross-clique centrality-based centrality algorithm, a Freemen centralization-based centrality algorithm, or a dissimilarity-based centrality algorithm.

Aspect 17: A non-transitory computer-readable medium comprising instructions that, when executed by a processor, causes the processor to perform a method of: collecting data related to a plurality of actions taken by a plurality of users in a computing environment, each user of the plurality of users either assigned a property or not assigned the property; generating a first graph representation for first users of the plurality of users that are assigned the property and a second graph representation for second users of the plurality of users that are not assigned the property; executing a centrality algorithm on the first graph representation and executing the centrality algorithm on the second graph representation to determine central nodes for the first graph representation and central nodes for the second graph representation; comparing the central nodes for the first graph representation and the central nodes for the second graph representation to identify a set of nodes unique to the first graph representation; selecting a particular action represented by a node of the set of nodes unique to the first graph representation; and providing output via a user interface based on the selecting of the particular action.

Aspect 18: The non-transitory computer-readable medium of Aspect 17, wherein generating the first graph representation for the first users of the plurality of users that are assigned the property and the second graph representation for the second users of the plurality of users that are not assigned the property comprises: for each respective first user having the property: representing one or more actions of the respective first user having the property as one or more nodes in the first graph representation; and for each respective node of the one or more nodes in in the first graph representation representing a next action from a previous action for the respective first user having the property, adding an edge between the respective node and a node representing the previous action in the first graph representation; and for each respective second user not having the property: representing one or more actions of the respective second user not having the property as one or more nodes in the second graph representation; and for each respective node of the one or more nodes in in the second graph representation representing a next action from a previous action for the respective second user not having the property, adding an edge between the respective node and a node representing the previous action in the second graph representation.

Aspect 19: The non-transitory computer-readable medium of any of Aspects 17-18, wherein the particular action is selected using an explore-exploit multi-armed bandit process to select a node of the set of nodes unique to the first graph representation.

Aspect 20: The non-transitory computer-readable medium of any of Aspects 17-19, wherein providing the output via the user interface based on the selecting of the particular action comprises displaying the particular action as at least one of a banner, a link, or a pop-up.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples.

For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:

collecting data related to a plurality of actions taken by a plurality of users in a computing environment, each user of the plurality of users either assigned a property or not assigned the property;

generating a first graph representation for first users of the plurality of users that are assigned the property and a second graph representation for second users of the plurality of users that are not assigned the property, wherein the generating of the first graph representation for the first users of the plurality of users that are assigned the property and the second graph representation for the second users of the plurality of users that are not assigned the property comprises:

for each respective first user having the property:

representing one or more actions of the respective first user having the property as one or more nodes in the first graph representation; and for each respective node of the one or more nodes in in the first graph representation representing a next action from a previous action for the respective first user having the property, adding an edge between the respective node and a node representing the previous action in the first graph representation; and for each respective second user not having the property:

representing one or more actions of the respective second user not having the property as one or more nodes in the second graph representation; and for each respective node of the one or more nodes in in the second graph representation representing a next action from a previous action for the respective second user not having the property, adding a corresponding edge between the respective node and a node representing the previous action in the second graph representation;

executing a centrality algorithm on the first graph representation and executing the centrality algorithm on the second graph representation to determine central nodes for the first graph representation and central nodes for the second graph representation;

comparing the central nodes for the first graph representation and the central nodes for the second graph representation to identify a set of nodes unique to the first graph representation;

selecting a particular action from the plurality of actions that is represented by a node of the set of nodes unique to the first graph representation; and providing output via a user interface based on the selecting of the particular action.

2. The method of claim 1, further comprising defining a page and action having a centrality value, wherein selecting the particular action comprises making a selection between a random action associated with the set of nodes unique to the first graph representation and an action with a highest centrality value based on a sampling value; and presenting the particular action.

3. The method of claim 2, further comprising, in response to detecting a navigation away from the particular action, presenting a second action comprising a different selection between a random action associated with the set of nodes unique to the first graph representation and an action with a highest centrality value based on the sampling value.

4. The method of claim 1, wherein the particular action is selected using an explore-exploit multi-armed bandit process to select a node of the set of nodes unique to the first graph representation.

5. The method of claim 1, wherein providing the output via the user interface based on the selecting of the particular action comprises displaying the particular action as at least one of a banner, a link, or a pop-up.

6. The method of claim 5, comprising, after a period of time since the particular action is presented, collecting second data related to the particular action, generating a new first graph representation and a new second graph representation and presenting a second action as a second selection based on the new first graph representation and the new second graph representation.

7. The method of claim 1, wherein the centrality algorithm comprises a selection from a degree-based centrality algorithm, a closeness-based centrality algorithm, a betweenness-based centrality algorithm, an Eigenvector-based centrality algorithm, a Katz's centrality measure-based centrality algorithm, a PageRank-based centrality algorithm, a percolation-based centrality algorithm, a cross-clique centrality-based centrality algorithm, a Freemen centralization-based centrality algorithm, or a dissimilarity-based centrality algorithm.

8. A system comprising a computing device having a processor and a memory having executable instructions stored thereon, which, when executed, cause the processor to perform a method of:

collecting data related to a plurality of actions taken by a plurality of users in a computing environment, each user of the plurality of users either assigned a property or not assigned the property;

generating a first graph representation for first users of the plurality of users that are assigned the property and a second graph representation for second users of the plurality of users that are not assigned the property, wherein the generating of the first graph representation for the first users of the plurality of users that are assigned the property and the second graph representation for the second users of the plurality of users that are not assigned the property comprises:

for each respective first user having the property:

representing one or more actions of the respective first user having the property as one or more nodes in the first graph representation; and for each respective node of the one or more nodes in in the first graph representation representing a next action from a previous action for the respective first user having the property, adding an edge between the respective node and a node representing the previous action in the first graph representation; and for each respective second user not having the property:

representing one or more actions of the respective second user not having the property as one or more nodes in the second graph representation; and for each respective node of the one or more nodes in in the second graph representation representing a next action from a previous action for the respective second user not having the property, adding a corresponding edge between the respective node and a node representing the previous action in the second graph representation;

executing a centrality algorithm on the first graph representation and executing the centrality algorithm on the second graph representation to determine central nodes for the first graph representation and central nodes for the second graph representation;

comparing the central nodes for the first graph representation and the central nodes for the second graph representation to identify a set of nodes unique to the first graph representation;

selecting a particular action from the plurality of actions that is represented by a node of the set of nodes unique to the first graph representation; and providing output via a user interface based on the selecting of the particular action.

9. The system of claim 8, wherein the method further comprises defining a page and action having a centrality value, wherein selecting the particular action comprises making a selection between a random action associated with the set of nodes unique to the first graph representation and an action with a highest centrality value based on a sampling value; and presenting the particular action.

10. The system of claim 9, wherein the method further comprises, in response to detecting a navigation away from the particular action, presenting a second action comprising a different selection between a random action associated with the set of nodes unique to the first graph representation and an action with a highest centrality value based on the sampling value.

11. The system of claim 8, wherein the particular action is selected using an explore-exploit multi-armed bandit process to select a node of the set of nodes unique to the first graph representation.

12. The system of claim 8, wherein providing the output via the user interface based on the selecting of the particular action comprises displaying the particular action as at least one of a banner, a link, or a pop-up.

13. The system of claim 12, wherein the method further comprises, after a period of time since the particular action is presented, collecting second data related to the particular action, generating a new first graph representation and a new second graph representation and presenting a second action as a second selection based on the new first graph representation and the new second graph representation.

14. The system of claim 8, wherein the centrality algorithm comprises a selection from a degree-based centrality algorithm, a closeness-based centrality algorithm, a betweenness-based centrality algorithm, an Eigenvector-based centrality algorithm, a Katz's centrality measure-based centrality algorithm, a PageRank-based centrality algorithm, a percolation-based centrality algorithm, a cross-clique centrality-based centrality algorithm, a Freemen centralization-based centrality algorithm, or a dissimilarity-based centrality algorithm.

15. A non-transitory computer-readable medium comprising instructions that, when executed by a processor, causes the processor to perform a method of:

collecting data related to a plurality of actions taken by a plurality of users in a computing environment, each user of the plurality of users either assigned a property or not assigned the property;

generating a first graph representation for first users of the plurality of users that are assigned the property and a second graph representation for second users of the plurality of users that are not assigned the property, wherein the generating of the first graph representation for the first users of the plurality of users that are assigned the property and the second graph representation for the second users of the plurality of users that are not assigned the property comprises:

for each respective first user having the property:

representing one or more actions of the respective first user having the property as one or more nodes in the first graph representation; and for each respective node of the one or more nodes in in the first graph representation representing a next action from a previous action for the respective first user having the property, adding an edge between the respective node and a node representing the previous action in the first graph representation; and for each respective second user not having the property:

representing one or more actions of the respective second user not having the property as one or more nodes in the second graph representation; and for each respective node of the one or more nodes in in the second graph representation representing a next action from a previous action for the respective second user not having the property, adding a corresponding edge between the respective node and a node representing the previous action in the second graph representation;

executing a centrality algorithm on the first graph representation and executing the centrality algorithm on the second graph representation to determine central nodes for the first graph representation and central nodes for the second graph representation;

comparing the central nodes for the first graph representation and the central nodes for the second graph representation to identify a set of nodes unique to the first graph representation;

selecting a particular action from the plurality of actions that is represented by a node of the set of nodes unique to the first graph representation; and providing output via a user interface based on the selecting of the particular action.

16. The non-transitory computer-readable medium of claim 15, wherein the particular action is selected using an explore-exploit multi-armed bandit process to select a node of the set of nodes unique to the first graph representation.

17. The non-transitory computer-readable medium of claim 15, wherein providing the output via the user interface based on the selecting of the particular action comprises displaying the particular action as at least one of a banner, a link, or a pop-up.

* * * * *